US012728439B2

(12) United States Patent
Ahn et al.

(10) Patent No.: US 12,728,439 B2
(45) Date of Patent: Sep. 8, 2026

(54) APPLICATOR HEAD FOR COATING APPLICATION AND ASSOCIATED SYSTEM AND METHOD

(71) Applicant: The Boeing Company, Arlington, VA (US)

(72) Inventors: Jonathan Y. Ahn, Seattle, WA (US); Alexander Strait, Seattle, WA (US); Christopher Brown, Seattle, WA (US); Ricardo Fritzke, Sammamish, WA (US); Michael Rumsey, Arlington, VA (US)

(73) Assignee: The Boeing Company, Arlington, VA (US)

( * ) Notice: Subject to any disclaimer, the term of this patent is extended or adjusted under 35 U.S.C. 154(b) by 69 days.

(21) Appl. No.: 18/892,173

(22) Filed: Sep. 20, 2024

(65) Prior Publication Data

US 2026/0084177 A1 Mar. 26, 2026

(51) Int. Cl.
*B05C 5/02* (2006.01)
*B05C 11/06* (2006.01)
*B05C 17/00* (2006.01)

(52) U.S. Cl.
CPC ............ *B05C 5/027* (2013.01); *B05C 5/0254* (2013.01); *B05C 11/06* (2013.01); *B05C 17/002* (2013.01)

(58) Field of Classification Search
None
See application file for complete search history.

(56) References Cited

U.S. PATENT DOCUMENTS

2012/0251726 A1* 10/2012 Kuniyasu .............. B05C 5/0254 427/372.2

FOREIGN PATENT DOCUMENTS

WO WO-2024212210 A1 * 10/2024 ............. B05B 1/044

OTHER PUBLICATIONS

U.S. Appl. No. 18/540,620, filed Dec. 14, 2023.

* cited by examiner

*Primary Examiner* — Alexander M Weddle
(74) *Attorney, Agent, or Firm* — Massey Bean & Lewis

(57) ABSTRACT

Disclosed herein is an applicator head and associated system and method for applying a coating to an object. The applicator head includes an elongated body with an external surface and an internal cavity. A coating inlet is formed in an upper portion of the elongated body and fluidically coupled with the internal cavity to enable a coating material to flow into the internal cavity from the coating inlet. A plurality of outlet ports are positioned along a lower portion of the elongated body and fluidically coupled with the internal cavity to enable the coating material to be dispensed from the internal cavity. A plurality of external ribs are disposed along the external surface of the elongated body and extend at a rib height from the external surface, at least one outlet port of the plurality of outlet ports is positioned between adjacent ones of the external ribs.

20 Claims, 14 Drawing Sheets

APPLICATOR HEAD FOR COATING APPLICATION AND ASSOCIATED SYSTEM AND METHOD

FIELD

This disclosure relates generally to the application of coatings to surfaces, and more particularly to an applicator head for coating applications.

BACKGROUND

The application of coatings, including sealants, to various surfaces often requires a consistent thickness and uniform coverage to ensure optimal performance. In aerospace applications, particularly with fay seals used to bond components, such as fay seals between the flanges of spars and wing panels, achieving the correct sealant thickness is important to help maintain structural integrity and prevent fuel leaks. Conventional sealant application methods often rely on manual application techniques, such as using paint-style rollers to spread the sealant over surfaces, and often require multiple passes to achieve the desired thickness. Such conventional sealant application processes are time-consuming and prone to errors, as variations in sealant consistency can lead to uneven application, which may require frequent inspections to ensure correct thickness. Additionally, inadequate application of the sealant may necessitate the use of secondary seals, such as fillet seals, which are often used to compensate for non-uniform seals and can be difficult and costly to apply effectively.

SUMMARY

The subject matter of the present application has been developed in response to the present state of the art, and in particular, in response to the shortcomings of conventional coating applications, that have not yet been fully solved by currently available techniques. Accordingly, the subject matter of the present application has been developed to provide an applicator head for applying a coating to an object and associated system and method that overcome at least some of the above-mentioned shortcomings of prior art techniques.

The following is a non-exhaustive list of examples, which may or may not be claimed, of the subject matter, disclosed herein.

Disclosed herein is an applicator head for applying a coating to an object including an elongated body having an external surface and an internal cavity extending along a body length of the elongated body. The applicator head also includes a coating inlet formed in an upper portion of the elongated body, and fluidically coupled with the internal cavity to enable a coating material to flow into the internal cavity from the coating inlet. The applicator head further includes a plurality of outlet ports positioned along a lower portion of the elongated body so that each one of the plurality of outlet ports is fluidically coupled with the internal cavity to enable the coating material to be dispensed from the internal cavity. Additionally, the applicator head includes a plurality of external ribs disposed along the external surface of the elongated body. Each one of the plurality of external ribs extends at a rib height from the external surface of the elongated body and at least one outlet port of the plurality of outlet ports is positioned between adjacent ones of the plurality of external ribs. The preceding subject matter of this paragraph characterizes example 1 of the present disclosure.

Each one of the plurality of external ribs is oriented perpendicular to a longitudinal axis extending through a center of the elongated body along the body length and only partially surrounds the external surface of the elongated body. The preceding subject matter of this paragraph characterizes example 2 of the present disclosure, wherein example 2 also includes the subject matter according to example 1, above.

Each one of the plurality of external ribs is evenly spaced along the body length of the elongated body so that a rib distance between adjacent ones of the plurality of external ribs is the same. The preceding subject matter of this paragraph characterizes example 3 of the present disclosure, wherein example 3 also includes the subject matter according to any of examples 1-2, above.

A size of the plurality of outlet ports is the same. The preceding subject matter of this paragraph characterizes example 4 of the present disclosure, wherein example 4 also includes the subject matter according to any of examples 1-3, above.

Alternatively, a size of at least one of the plurality of outlet ports is different than a size of at least another of the plurality of outlet ports. The preceding subject matter of this paragraph characterizes example 5 of the present disclosure, wherein example 5 also includes the subject matter according to any of examples 1-3, above.

Each one of the plurality of outlet ports is aligned along a port axis. The port axis is parallel to and offset from a longitudinal axis extending through a center of the elongated body along the body length. The preceding subject matter of this paragraph characterizes example 6 of the present disclosure, wherein example 6 also includes the subject matter according to any of examples 1-5, above.

The applicator head may include a bead notch in the lower portion of the elongated body. The bead notch is oriented parallel to the plurality of external ribs and is fluidically coupled with the internal cavity. The preceding subject matter of this paragraph characterizes example 7 of the present disclosure, wherein example 7 also includes the subject matter according to any of examples 1-6, above.

The applicator head may include a plurality of internal cavities extending along the body length of the elongated body, the internal cavity being one of the plurality of internal cavities and a plurality of coating inlets formed in the upper portion of the elongated body, the coating inlet being one of the plurality of coating inlets. The plurality of internal cavities are laterally aligned along the elongated body so that each internal cavity is positioned adjacent to others of the plurality of internal cavities along the body length of the elongated body. Each one of the plurality of coating inlets is fluidically coupled with a corresponding one of the plurality of internal cavities to enable the coating material to flow into the plurality of internal cavities from the corresponding coating inlet. Each one of the plurality of internal cavities corresponds to selected ones of the plurality of outlet ports. The preceding subject matter of this paragraph characterizes example 8 of the present disclosure, wherein example 8 also includes the subject matter according to any of examples 1-7, above.

Further disclosed herein is a coating application system for applying a coating to an object. The coating application system includes an end effector removably attached to a robotic arm. The coating application system also includes an applicator head attached to a lower end of the end effector and including an elongated body having an external surface and an internal cavity extending along a body length of the elongated body. The applicator head also includes a coating inlet formed in an upper portion of the elongated body, and fluidically coupled with the internal cavity to enable a coating material to flow into the internal cavity from the coating inlet. The applicator head further includes a plurality of outlet ports positioned along a lower portion of the elongated body so that each one of the plurality of outlet ports is fluidically coupled with the internal cavity to enable the coating material to be dispensed from the internal cavity. Additionally, the applicator head includes a plurality of external ribs disposed along the external surface of the elongated body. Each one of the plurality of external ribs extends at a rib height from the external surface of the elongated body and at least one outlet port of the plurality of outlet ports is positioned between adjacent ones of the plurality of external ribs. The coating application system further includes a coating reservoir removably attached to the end effector and fluidically coupled with the coating inlet of the applicator head. The coating reservoir is configured to selectively supply the coating material to the applicator head. The end effector is configured to control movement of the applicator head relative to a coating-receiving surface of the object, such that the applicator head is movable along the coating-receiving surface. When the applicator head is moved along the coating-receiving surface, each one of the plurality of external ribs is in contact with the coating-receiving surface. When the coating reservoir is supplying the coating material to the applicator head and the applicator head is moved along the coating-receiving surface, the coating material is dispensed from the plurality of outlet ports onto the coating-receiving surface to form the coating of the coating material having a coating thickness defined by the rib height of the plurality of external ribs. The preceding subject matter of this paragraph characterizes example 9 of the present disclosure.

The end effector includes a base assembly configured to attach to the robotic arm. The end effector also includes a rotatable assembly rotatably coupled to the base assembly. The rotatable assembly rotates about a pivot axis. The applicator head and the coating reservoir are attached to the rotatable assembly of the end effector. The end effector further includes a rotation system having at least one guide rail mounted on the rotatable assembly and at least one rail-coupler mounted to the base assembly and coupled to the at least one guide rail to rotatably couple the rotatable assembly to the base assembly. The rotation system enables passive rotation of the rotatable assembly relative to the base assembly as the end effector is moved along the coating-receiving surface of the object. The preceding subject matter of this paragraph characterizes example 10 of the present disclosure, wherein example 10 also includes the subject matter according to example 9, above.

The coating application system includes a laser profilometer mounted to the end effector and configured to continuously measure the coating thickness of the coating at a fixed measurement point, relative to the end effector. The preceding subject matter of this paragraph characterizes example 11 of the present disclosure, wherein examples 11 also includes the subject matter according to any of examples 9-10, above.

The coating application system includes a reservoir actuator operably connected to the coating reservoir and configured to regulate the supply of the coating material from the coating reservoir to the applicator head. The preceding subject matter of this paragraph characterizes example 12 of the present disclosure, wherein example 12 also includes the subject matter according to any of examples 9-11, above.

The end effector is configured to apply the coating material uniformly across the coating-receiving surface in a single pass of the applicator head. The preceding subject matter of this paragraph characterizes example 13 of the present disclosure, wherein example 13 also includes the subject matter according to any of examples 9-12, above.

The coating application system may include a plurality of coating reservoirs removably attached to the end effector, the coating reservoir being one of the plurality of coating reservoirs. The application head further includes a plurality of internal cavities extending along the body length of the elongated body, the internal cavity being one of the plurality of internal cavities and a plurality of coating inlets formed in the upper portion of the elongated body, the coating inlet being one of the plurality of coating inlets. The plurality of internal cavities are laterally aligned along the elongated body so that each internal cavity is positioned adjacent to others of the plurality of internal cavities along the body length of the elongated body. Each one of the plurality of coating reservoirs is fluidically coupled with a corresponding one of the plurality of coating inlets of the applicator head. Each one of the plurality of coating inlets is fluidically coupled with a corresponding one of the plurality of internal cavities to enable the coating material to flow into the plurality of internal cavities from the corresponding coating inlet. Each one of the plurality of internal cavities corresponds to selected ones of the plurality of outlet ports. The preceding subject matter of this paragraph characterizes example 14 of the present disclosure, wherein example 14 also includes the subject matter according to any of examples 9-13, above.

Each one of the plurality of coating reservoirs is individually operable to enable the coating material to flow into a corresponding one of the plurality of internal cavities and dispense the coating material from the selected ones of the plurality of outlet ports. The preceding subject matter of this paragraph characterizes example 15 of the present disclosure, wherein example 15 also includes the subject matter according to example 14, above.

Alternatively, the coating application system includes a plurality of coating reservoirs removably attached to the end effector, the coating reservoir being one of the plurality of coating reservoir. A plurality of applicator heads are attached to the lower end of the end effector, the applicator head being one of the plurality of applicator heads. Each one of the plurality of coating reservoirs is fluidically coupled with the coating inlet of a corresponding one of the plurality of applicator heads and configured to selectively supply the coating material to the corresponding one of the plurality of applicator heads. The preceding subject matter of this paragraph characterizes example 16 of the present disclosure, wherein example 16 also includes the subject matter according to any of examples 9-13, above.

The coating application system also includes a first air knife mounted to the applicator head at a first end of the elongated body. The first air knife extending forward of the applicator head and directed toward the coating-receiving surface and configured to generate a curtain of air along a first edge of the coating. The coating application system also includes a second air knife mounted to the applicator head at a second end of the elongated body. The second air knife extends forward of the applicator head, is directed toward the coating-receiving surface, and is configured to generate a curtain of air along a second edge of the coating. When the coating material is dispensed from the plurality of outlet ports onto the coating-receiving surface to form the coating, the curtain of air from the first air knife is directed at the first edge of the coating and the curtain of air from the second air knife is directed at the second edge of the coating to prevent the coating material from extending beyond the first edge and the second edge. The preceding subject matter of this paragraph characterizes example 17 of the present disclosure, wherein example 17 also includes the subject matter according to any of examples 9-16, above.

Further disclosed herein is a method of applying a coating to an object. The method includes supplying a coating material from a coating reservoir to an internal cavity of an applicator head. The coating reservoir is fluidically coupled with the internal cavity of the applicator head. The method also includes moving the applicator head along a coating-receiving surface of the object while maintaining a plurality of external ribs of the applicator head in contact with the coating-receiving surface. The method further includes dispensing the coating material from the internal cavity through a plurality of outlet ports of the applicator head onto the coating-receiving surface to form a coating of the coating material having a coating thickness defined by a rib height of the plurality of external ribs. The preceding subject matter of this paragraph characterizes example 18 of the present disclosure.

The step of moving the applicator head along the coating-receiving surface of the object is controlled by an end effector attached to a robotic arm. The applicator head is attached to a lower end of the end effector. The step of dispensing the coating material from the internal cavity through the plurality of outlet ports of the applicator head is facilitated by the end effector. The method additionally includes regulating the flow of the coating material via the end effector. The preceding subject matter of this paragraph characterizes example 19 of the present disclosure, wherein example 19 also includes the subject matter according to example 18, above.

The step of moving the applicator head along the coating-receiving surface of the object is manually controlled by a user. The preceding subject matter of this paragraph characterizes example 20 of the present disclosure, wherein example 20 also includes the subject matter according to example 18, above.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Figure 1:
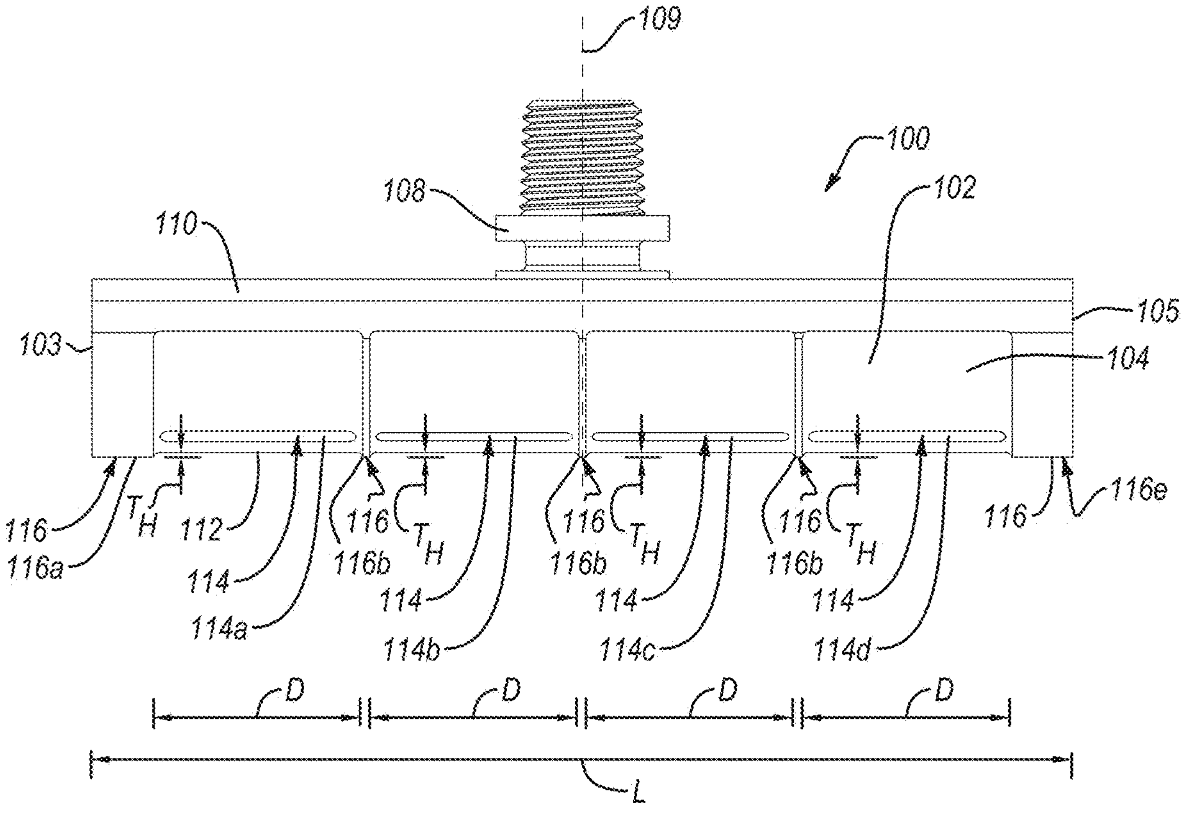
FIG. 1 is a schematic perspective view of one example of an applicator head, according to one or more examples of the present disclosure.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein is an applicator head, and associated system and method, for applying a coating to an object, such as a sealant, with a consistent thickness. The applicator head is configured to facilitate the controlled application of a coating material, which may ensure optimal coverage of the coating on a surface. Specifically, an internal cavity of the applicator head is designed to receive the coating material and dispense the coating material through a plurality of outlet ports onto a surface. A plurality of external ribs are configured to regulate the thickness of the applied coating by maintaining a consistent spacing between an external surface of the applicator head and the surface during the application of the coating material. The applicator head may be used manually or may be integrated into an automated coating application system via an end effector attached to a robotic arm for automated application. The method of applying the coating, using the applicator head, may reduce the need for multiple passes and manual inspections, as the coating material is applied at a defined thickness, which may reduce time and costs compared to conventional coating application processes.

The applicator head may be used in aerospace applications, such as for applying sealants, like fay seals, to components like spars and wing panels. Conventionally, fay seals are prone to inconsistencies when formed due to variations in sealant distribution, which often require three to ten passes of sealant to achieve a desired thickness. When applied too thinly the sealant may not provide sufficient bonding, while excessive thickness can prevent proper fastening of parts. To address these issues, mechanics often frequently survey the sealant with gauges to measure the thickness, which can be time-consuming and labor-intensive. By applying a consistent thickness of sealant across a surface, the applicator head helps ensure uniform coverage, without the need for frequent confirming measurements, and therefore proper bonding between components. This consistent application may also reduce the need for secondary seals, such as fillet seals, which are often used in conventional sealing processes to address gaps or variations in sealant thickness that can lead to fuel leaks or other issues.

According to some examples, an applicator head 100 is shown in FIG. 1. The applicator head 100 is configured for applying a coating to a coating-receiving surface of an object. As used herein, a coating refers to a flowable material that is applied to a coating-receiving surface for the purposes of sealing, insulation, decoration, protection, or altering the surface properties of the object. This can include, but is not limited to, materials such as paint, sealants, adhesives, lubricants, glutinous materials, viscous materials, and other flowable substances.

The applicator head 100 includes an elongated body 102 that extends along a body length (L), which defines the overall length of the application head 100. The body length extends (L) from a first end 103 to a second end 105 of the applicator head 100. The body length (L) of the elongated body 102 is longer than a width of the applicator head 100, giving the applicator head 100 a lengthwise orientation suited for spreading coatings onto an object over a large area. The elongated body 102 may have any of various shapes and sizes and can include, but is not limited to, generally cylindrical, generally rectangular, or other geometric forms. The elongated body 102 has an external surface 104, which is the outermost layer of the elongated body 102 and is configured to be adjacent to a coating-receiving surface of an object during a coating application process. The elongated body 102 is configured to house internal components and support external features, such as an internal cavity 106, a coating inlet 108, outlet ports 114, and external ribs 116, which allow for the distribution and application of a coating.

A plurality of external ribs 116 are disposed along the body length (L) of the external surface 104 of the elongated body 102. Each one of the plurality of external ribs 116 extends outward from the external surface 104 at a rib height (H). In other words, the plurality of external ribs 116 protrude from the external surface 104 in a manner such that, during a coating application process, only the plurality of external ribs 116 are configured to contact a coating-receiving surface of an object. The rib height (H) of each one of the plurality of external ribs 116 is the same, such that the external surface 104 of the elongated body 102 remains consistently spaced apart from an object during a coating application process. Moreover, the plurality of external ribs 116 extends about at least a portion of the external surface 104. In other words, in some examples, the plurality of external ribs 116 only partially surround the external surface 104 of the elongated body 102. The arrangement of the plurality of external ribs 116 ensures that the portion of the applicator head 100 configured to interface with a coating-receiving surface of an object is defined by the plurality of external ribs 116, rather than the external surface 104 itself. In some examples, the rib height (H) is between and inclusive of 0.001 inches to 1.0 inches. In other examples, the rib height (H) is between and inclusive of 0.01 inches and 0.05 inches. In yet other examples, the rib height (H) is between and inclusive of 0.015 inches and 0.02 inches.

The plurality of external ribs 116 are orientated perpendicular to a longitudinal axis 118 (see, e.g., FIG. 2B) extending through a center of the elongated body 102 along the body length (L). In other words, the plurality of external ribs 116 are aligned parallel to a direction of movement of the applicator head 100 as it moves along a coating-receiving surface during a coating application process. By extending perpendicular to the body length (L), the plurality of external ribs 116 make minimal contact with the coating-receiving surface, thereby allowing for a uniform distribution of a coating material across a width of the coating. Because the plurality of external ribs 116 limit the coating material from being applied directly in the areas where the plurality of external ribs 116 make contact with the coating-receiving surface, minimal contact with the applicator head

100 helps avoid leaving too many uncoated areas. Depending on the viscosity of the coating material, the coating may spread into the uncoated areas left by the plurality of external ribs after application, thereby mitigating potential gaps in the coating.

In some examples, the plurality of external ribs 116 are evenly spaced along the body length (L) of the elongated body 102. That is, a rib distance (D) between adjacent ones of the plurality of external ribs 116 is the same. The even spacing helps create a uniform pattern of contact points between the applicator head 100 and a coating-receiving surface during a coating application process. In other examples, the spacing between at least one pair of adjacent external ribs may differ from others of the plurality of external ribs 116, so that the rib distance (D) between adjacent external ribs 116 is not consistent. As shown, the applicator head 100 has five external ribs, including a first external rib 116*a*, a second external rib 116*b*, a third external rib 116*c*, a fourth external rib 116*d*, and a fifth external rib 116*e*, where the rib distance (D) between all of the adjacent ones of the externals ribs is the same. Although the applicator head 100 shown has five external ribs, the applicator head 100 may include any number of external ribs, and may include more or less than the five external ribs illustrated.

In some examples, the plurality of external ribs 116 may have varying widths. For example, outer external ribs (e.g., the first external rib 116*a* and the fifth external rib 116*e*) may be wider than inner external ribs (e.g., the second external rib 116*b*, the third external rib 116*c*, and the fourth external rib 116*d*). The wider outer external ribs may be configured to help prevent coating material from bleeding beyond a respective edge of the elongated body 102.

A coating inlet 108 is formed in an upper portion 110 of the elongated body 102 of the applicator head 100 and is fluidically coupled with an internal cavity 106 (see, e.g., FIG. 3B) to enable a coating material to flow into the internal cavity 106 from the coating inlet 108. In some examples, the coating inlet 108 is positioned along a central axis 109 of the elongated body 102. The central axis 109 extends through the center of the applicator head 100 and is perpendicular to the longitudinal axis 118, which extends along the length of the elongated body 102. The central axis 109 defines a vertical line that bisects the applicator head 100 and serves as a reference point for positioning components, such as the coating inlet 108, in a balanced and symmetrical manner. The central positioning helps promote an even distribution of the coating material within the internal cavity 106. That is, the coating material can flow symmetrically within the internal cavity 106 toward both ends of the internal cavity 106 from the coating inlet 108. Additionally, when the applicator head 100 is in use, the positioning of the coating inlet 108, above the internal cavity 106, enables the coating material to flow downward from the coating inlet 108 into the internal cavity 106. The flow may occur passively through gravity or be actively assisted by a pressurizing mechanism.

The coating inlet 108 may have any of various shapes and sizes, with a central opening through which the coating material is configured to be introduced into the internal cavity 106. For example, the coating inlet 108 may have a generally circular or oval shape. The size and shape of the coating inlet 108 may be configured to accommodate different viscosities of coating material, which may help with the efficient flow of the coating material into the internal cavity 106. The coating inlet 108 may also be threaded or otherwise adapted for connection to a coating reservoir, which houses the coating material.

The applicator head 100 also includes a plurality of outlet ports 114. The plurality of outlet ports 114 are positioned along a lower portion 112 of the elongated body 102 so that each one of the plurality of outlet ports 114 is fluidically coupled with the internal cavity 106 (see, e.g., FIG. 3B) to enable a coating material to be dispensed from the internal cavity 106. In other words, the plurality of outlet ports 114 are configured to allow a coating material to flow out of the applicator head 100 in a controlled manner during a coating application process. Each one of the plurality of outlet ports 114 is spaced apart from adjacent outlet ports 114 along the body length (L) of the elongated body 102. In some examples, the plurality of outlet ports 114 may be spaced apart to ensure an even distribution of coating material is dispensed from the plurality of outlet ports 114.

At least one outlet port of the plurality of outlet ports is positioned between adjacent ones of the plurality of external ribs 116. As shown, the applicator head 100 has four outlet ports, a first outlet port 114*a*, a second outlet port 114*b*, a third outlet port 114*c*, and a fourth outlet port 114*d*. Specifically, the first outlet port 114*a* is located between the first external rib 116*a* and the second external rib 116*b*, such that as the coating material is dispensed from the first outlet port 114*a*, the first external rib 116*a* and the second external rib 116*b* are utilized to maintain the thickness of the coating material between the ribs. Although the applicator head 100 shown has four outlet ports, the applicator head 100 may include any number of outlet ports, including more or less than the four outlet ports illustrated.

The plurality of outlet ports 114 may have any of various shapes and sizes. In some examples, a size and a shape of the plurality of outlet ports 114 is the same. For example, each one of the plurality of outlet ports may be a uniform size and shape, such as generally circular or oval-shaped openings of the same dimensions. Uniformity of the plurality of outlet ports 114 may help with a consistent flow of coating material across the entire length of the applicator head 100. In other examples, a size and/or a shape of at least one of the plurality of outlet ports 114 is different than a size and/or a shape of at least another of the plurality of outlet ports 114. For example, outlet ports located closer to the coating inlet 108 may be smaller, and therefore have a reduced flow capacity, compared to outlet ports located farther away from the coating inlet 108.

Figure 2A:
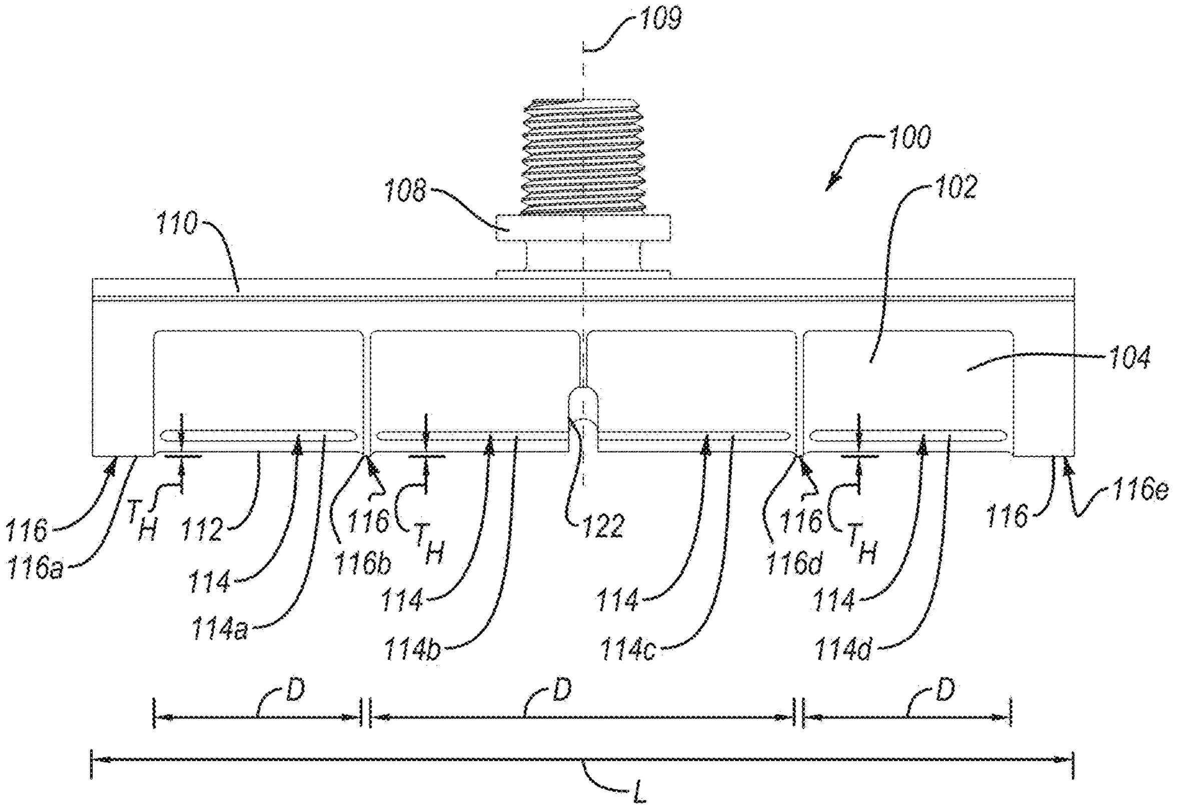
FIG. 2A is a schematic perspective view of another example of an applicator head, with a bead notch, according to one or more examples of the present disclosure.
Figure 2B:
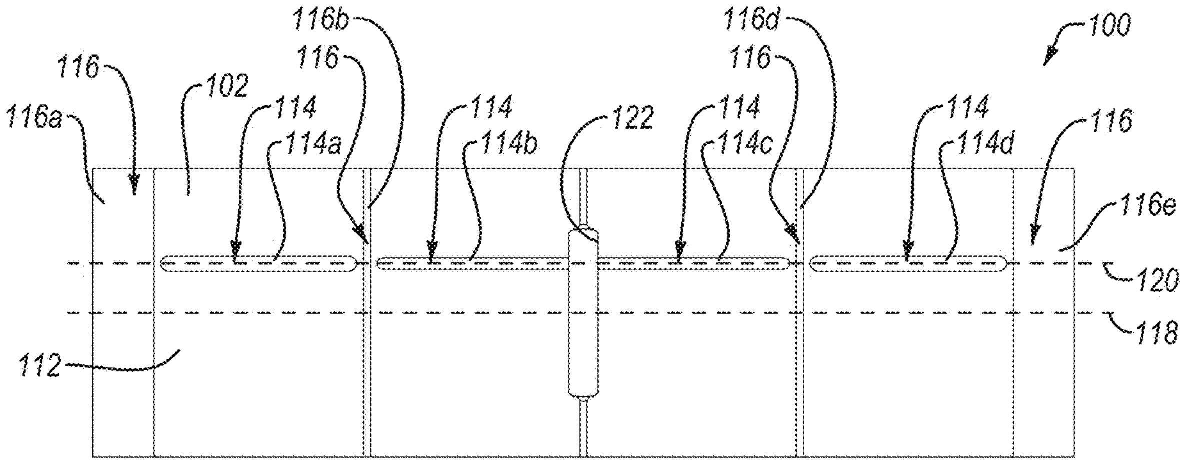
FIG. 2B is a schematic bottom view of the applicator head of FIG. 2A, according to one or more examples of the present disclosure.

As shown in FIG. 2B, each one of the plurality of outlet ports 114 is aligned along a port axis 120. The port axis 120 is parallel to and offset (i.e., separated) from a longitudinal axis 118 extending through a center of the elongated body 102 along the body length (L). The port axis 120 is configured to be forward-facing relative to the direction of movement of the applicator head 100 during the coating application process. In other words, as the applicator head 100 moves along the coating-receiving surface, the port axis 120 is oriented such that the coating material is dispensed ahead of the portion of the applicator head 100 that makes contact with and spreads the material. This configuration allows the dispensed coating material to be smoothed and leveled as the applicator head 100 moves forward. In some examples, the plurality of outlet ports 114 are angled slightly away from the coating-receiving surface, allowing the coating material to be dispensed at a controlled distance from the surface. For example, when the applicator head 100 is used in an upright position, the longitudinal axis 118 is oriented perpendicular to the coating-receiving surface, and the port axis 120 faces slightly forward, dispensing the coating material in front of the contact area. In other examples, the port axis 120 is oriented more directly toward the coating-receiving surface, applying the coating material closer to the surface for immediate spreading. In yet other examples, the port axis 120 is angled further away from the coating-receiving surface, applying the coating material a higher point above the coating-receiving surface for a more gradual spreading.

Referring to FIGS. 2A and 2B, in some examples, the applicator head 100 includes a bead notch 122 in the lower portion 112 of the elongated body 102. The bead notch 122 is oriented parallel to the plurality of external ribs 116. In other words, the bead notch 122 is aligned parallel to a direction of movement of the applicator head 100 as it moves along a coating-receiving surface during a coating application process. The bead notch 122 is fluidically coupled with the internal cavity 106 to allow coating material to flow through and be dispensed from the bead notch 122 as a bead of coating material within the coating. Specifically, the bead notch 122 is a recessed, deep opening in the external surface 104 of the elongated body 102, extending along the lower portion 112. The deep opening allows a greater volume of coating material to be dispensed through the bead notch 122 compared to the plurality of outlet ports 114, which is not smoothed or leveled out by the external surface 104. This results in a bead that has a thickness greater than the surrounding coating. The thicker bead can be used in areas where additional seals or bonding is preferred, such as along joints or edges of the object being coated.

The bead notch 122 may be located at any location along the body length (L) of the applicator head 100. In some examples, the bead notch 122 is centrally positioned along the central axis 109 of the elongated body 102. The bead notch 122 may be fluidically coupled with at least one outlet port, or it may be spaced apart from the plurality of outlet ports 114 to allow for independent dispensing. In some examples, the applicator head 100 may include multiple bead notches 122, each configured to dispense a corresponding bead of coating material along different areas of the coating-receiving surface.

Figure 3A:
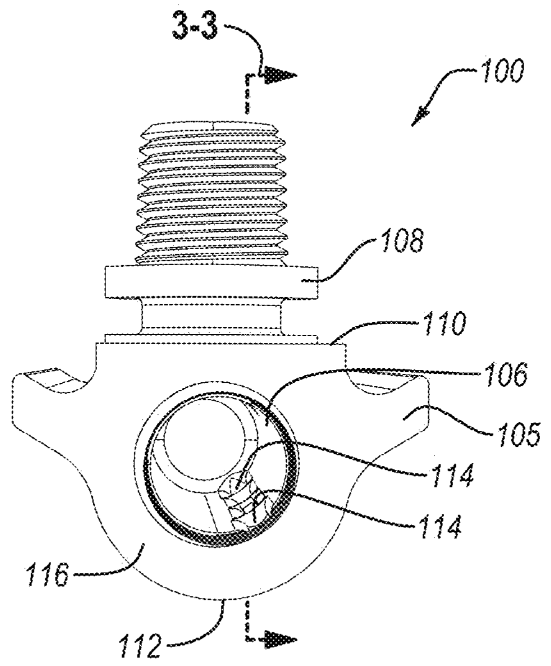
FIG. 3A is a schematic side view of the applicator head of FIG. 2A, according to one or more examples of the present disclosure.

Referring to FIG. 3A, an end view of the applicator head 100 is shown, illustrating the second end 105. In this view, the internal cavity 106, located within the elongated body 102, is visible due to the open end. Although the second end 105 is depicted as open for illustration purposes, in practice, the second end 105 would be enclosed or capped to seal the internal cavity 106, preventing leakage of the coating material from either the first end 103 or the second end 105 of the elongated body 102. The internal cavity 106 is designed to receive, store, and dispense coating material along the body length (L) of the applicator head 100. In some examples, as shown, the external surface 104 of the applicator head 100 has a generally rounded or partially cylindrical shape. The curvature of the external surface 104 and the plurality of external ribs 116 allows for smooth contact and efficient movement along a coating-receiving surface during a coating application process. The shape of the applicator head 100 is configured to facilitate even distribution of the coating material while maintaining ease of movement across the coating-receiving surface.

Figure 3B:
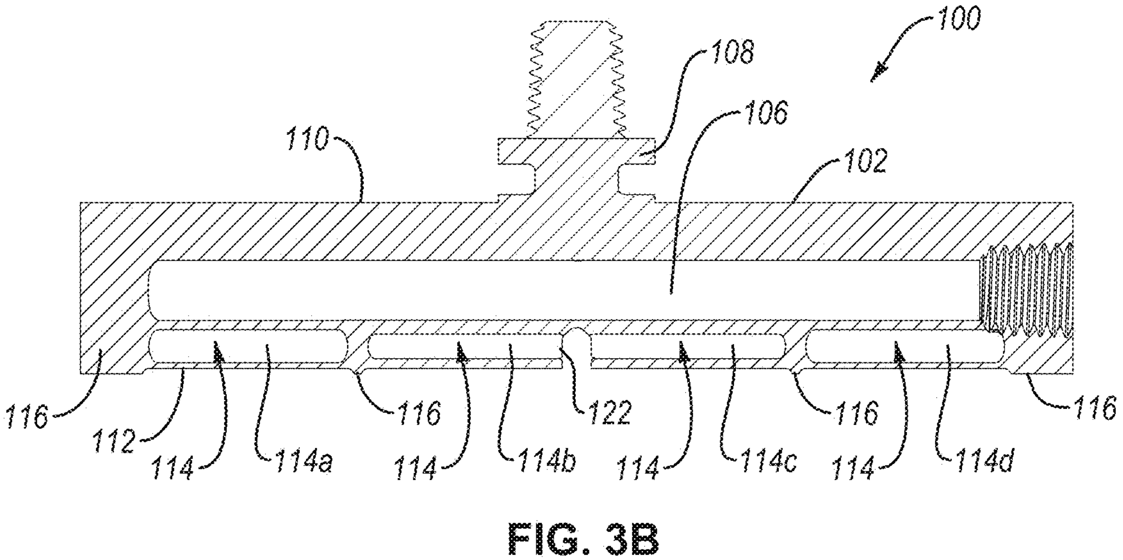
FIG. 3B is a schematic cross-sectional view of the applicator head of FIG. 2A, taken along the plane 3-3 of FIG. 3A, according to one or more examples of the present disclosure.

As shown in FIG. 3B is a cross-section of the applicator head 100, illustrating the internal cavity 106 extending along the length of the elongated body 102, and fluidically coupled to the coating inlet 108 and the plurality of outlet ports 114. As shown, the plurality of outlet ports 114 are positioned at regular intervals along the lower portion 112 of the elongated body 102. The bead notch 122, located between adjacent ones of the plurality of external ribs 116, is also shown fluidically coupled to adjacent outlet ports. This configuration enables the bead notch 122 to dispense a bead of coating material, which extends above the consistent thickness of the coating material dispensed by the adjacent outlet ports.

The ends of the applicator head 100 are enclosed, such as at the first end 103, which ensures the internal cavity 106 remains sealed during use. However, at least one end, such as the second end 105, may be configured to be openable. For example, the second end 105 may include threading or other attachment mechanisms, allowing for components such as an end cap to enclose the internal cavity 106. In some examples, a pressure system may also be connectable to the second end 105 to enclose and pressurize the internal cavity 106 when required for specific applications.

Figure 4A:
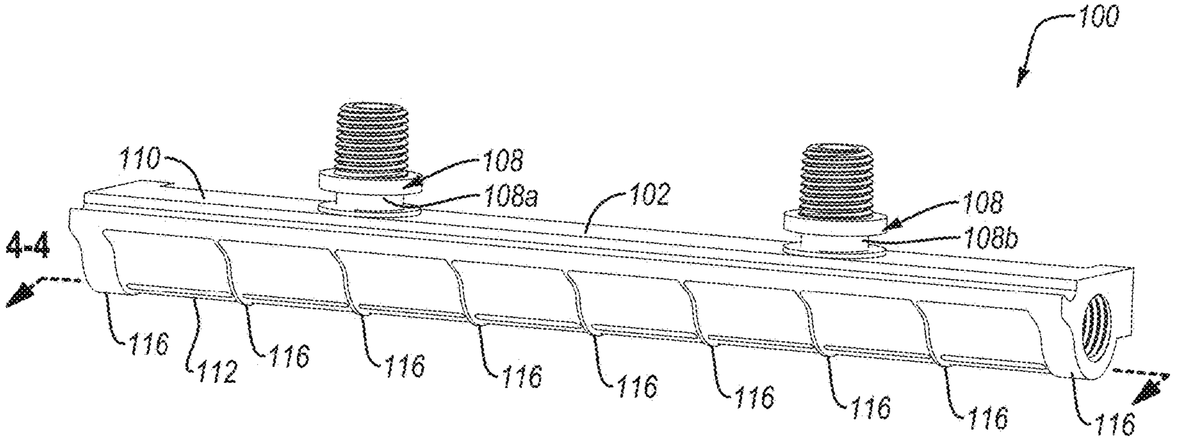
FIG. 4A is a schematic perspective view of another example of an applicator head, having multiple coating inlets, according to one or more examples of the present disclosure.
Figure 4B:
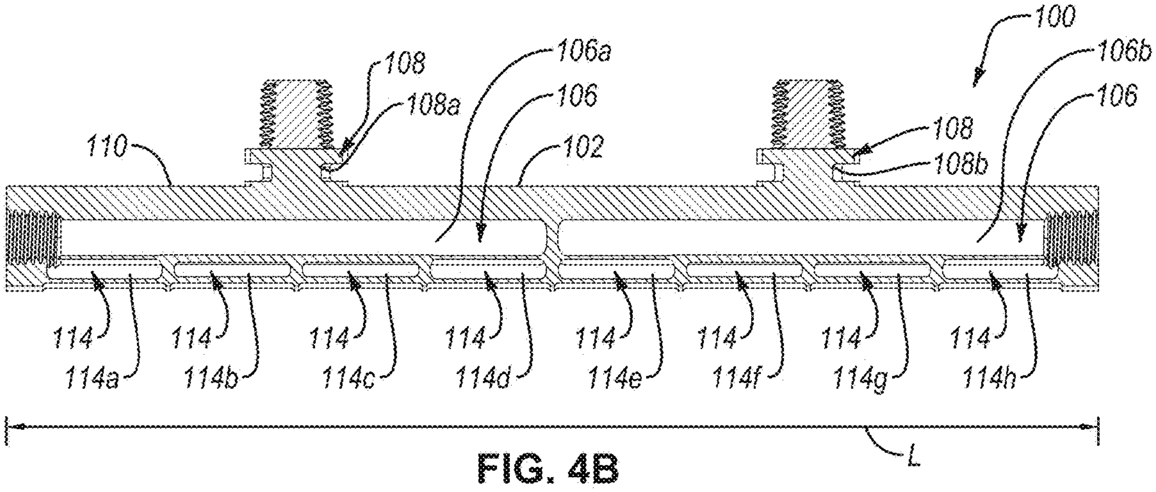
FIG. 4B is a schematic cross-sectional view of the applicator head of FIG. 4A, taken along the plane 4-4 of FIG. 4A, according to one or more examples of the present disclosure.

In some examples, as shown in FIGS. 4A and 4B, the applicator head 100 may include a plurality of internal cavities 106 and a plurality of coating inlets 108, where each one of the plurality of coating inlets 108 is fluidically coupled with a respective one of the plurality of internal cavities 106. For example, the applicator head 100 includes a first coating inlet 108*a* that corresponds to a first internal cavity 106*a*, and a second coating inlet 108*b* that corresponds to a second internal cavity 106*b*. That is, each coating inlet 108 allows a coating material to flow into its respective internal cavity 106. Each one of the plurality of internal cavities 106 also corresponds to selected ones of the plurality of outlet ports 114. For example, the first internal cavity 106*a* corresponds to a first outlet port 114*a*, a second outlet port 114*b*, a third outlet port 114*c*, and a fourth outlet port 114*d*, while the second internal cavity 106*b* corresponds to a fifth outlet port 114*e*, a sixth outlet port 114*f*, a seventh outlet port 114*g*, and an eighth outlet port 114*h*. Although the applicator head 100 is depicted with two coating inlets and corresponding internal cavities, the application head 100 may include any number of coating inlets and corresponding internal cavities, depending on the size of the applicator head 100 and the specific coating application requirements.

The plurality of internal cavities 106 are arranged in a lateral alignment along the elongated body 102. In other words, each internal cavity 106 is positioned adjacent to others of the plurality of internal cavities along the body length (L) of the elongated body 102. Utilizing multiple internal cavities allows for a longer overall length of the applicator head 100. By distributing the coating material through multiple internal cavities 106 and corresponding outlet ports 114, the applicator head 100 can be used to provide a consistent thickness of coating material along the body length (L). In some examples, each of the plurality of internal cavities 106 is used simultaneously to apply coating material across the entire body length (L) of the applicator head 100. In other examples, the plurality of internal cavities 106 can be operated independently, enabling selective use of different sections of the applicator head 100. That is, targeted application of the coating material can be used without requiring the entire applicator head 100 to be active simultaneously.

In some examples, the applicator head 100 is configured to be used manually. That is, the applicator head 100 can be operated directly by a user during a coating application process. A coating reservoir is connectable to the coating inlet 108, to supply coating material to the internal cavity 106. In some examples, the coating reservoir may be used as a handle, allowing the user to hold the coating reservoir while moving the applicator head 100 across a coating-receiving surface. During manual operation, the user applies pressure as needed, while moving the applicator head 100 in a smooth motion across the coating-receiving surface. The plurality of outlet ports 114 dispense the coating material, while the plurality of external ribs 116 maintains the desired thickness and the external surface 104 spreads the coating material at a consistent thickness. Manual operation allows the applicator head 100 to be used efficiently for coating tasks where manual control is advantageous.

Figure 5:
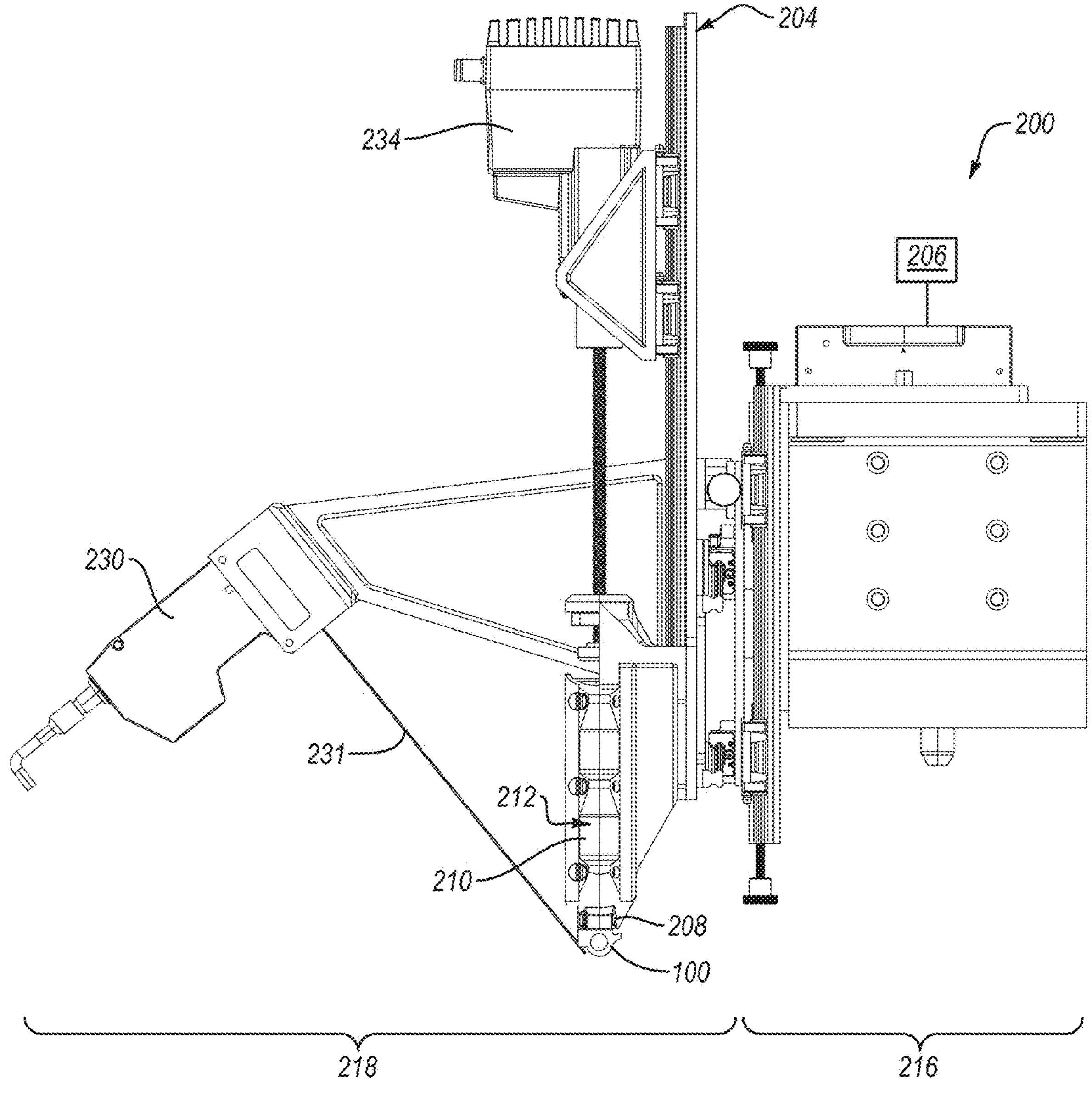
FIG. 5 is a schematic side view of one example of a coating application system, according to one or more examples of the present disclosure.

In other examples, the applicator head 100 is configured to be used with a coating application system 200, as shown in FIGS. 5 through 12, allowing for automation during the coating application process. As shown in FIG. 5, the coating application system 200 includes an end effector 204, which is removably attached to a robotic arm 206. The end effector 204 supports the applicator head 100, which is attached to a lower end 208 of the end effector 204. The lower end 208 is the lowest-most point of the end effector 204, such that only the applicator head 100 comes in contact with the coating-receiving surface during the coating application process. The robotic arm 206 is configured to control the movement of the end effector 204, and consequently, the movement of the applicator head 100 relative to the coating-receiving surface 201 of the object 202, allowing the applicator head 100 to move along the coating-receiving surface 201 (see, e.g., FIG. 7). In some examples, the robotic arm 206 controls the movement of the end effector 204 in such a way that the longitudinal axis 118 of the applicator head 100 remains substantially perpendicular to the coating-receiving surface 201 during the coating application process. Similar to the manual operation, the plurality of outlet ports 114 of the applicator head 100 dispense the coating material, while the plurality of external ribs 116 maintains the desired thickness and the external surface 104 spreads the coating material at a consistent thickness, as the end effector 204 is moved along the coating-receiving surface.

Figure 6:
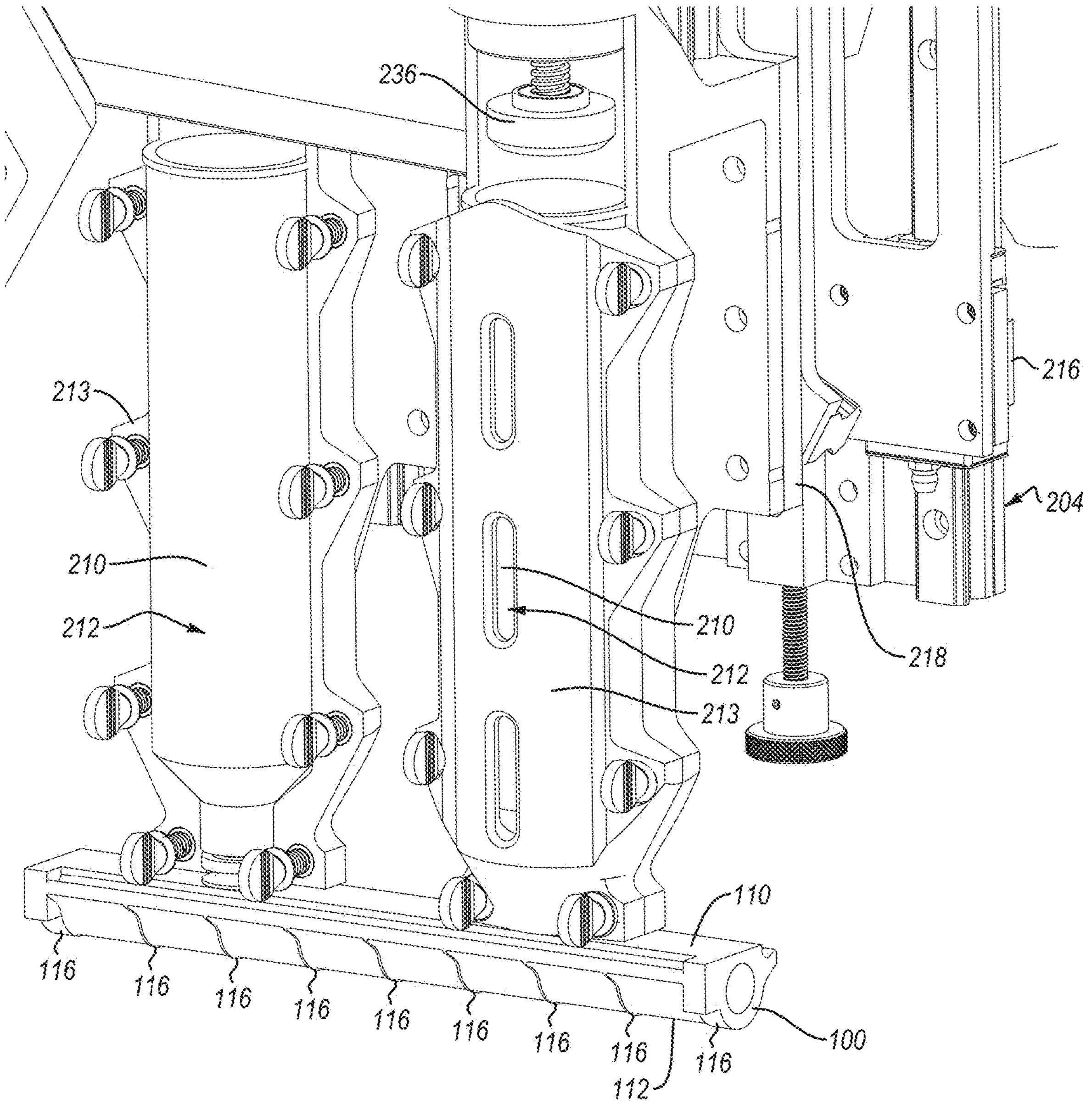
FIG. 6 is a schematic, perspective, partial view of a coating application system, having two coating reservoirs, according to one or more examples of the present disclosure.

A coating reservoir 212 is removably attached to the end effector 204 and fluidically coupled with the coating inlet 108 of the applicator head 100 to supply the coating material 210. Referring to FIG. 6, the coating reservoir 212 is configured to hold a volume of coating material 210. In some examples, the coating reservoir 212 may include an outer cover 213, which is removably securable around a container that holds the coating material 210. The outer cover 213 is configured to keep the container in place while the end effector 204 is moved during the coating application process. When the coating material needs to be replenished, the container can be removed and replaced with a new container filled with fresh coating material 210.

In some examples, the coating application system 200 has multiple coating reservoirs 212, where each one of the coating reservoirs 212 is removably attached to the end effector 204 and fluidically coupled with a corresponding coating inlet 108 of the applicator head 100. That is, each coating reservoir 212 is configured to supply coating material 210 to a corresponding internal cavity 106, via the corresponding coating inlet 108. In some examples, each one of the multiple coating reservoirs 212 operates simultaneously, allowing the application head 100 to receive coating material 210 from all of the coating reservoirs 212 at once. In other examples, only selected ones of the coating reservoirs 212 are active, supplying coating material 210 to specific sections of the application head 100, while others remain inactive. That is, each one of the plurality of coating reservoirs 212 may be individually operable to enable the coating material 210 to flow into a corresponding one of the plurality of internal cavity 106 of the applicator head 100 and dispense the coating material 210 from the corresponding plurality of outlet ports 114. Selective control enables the application of coating material 210 across specific areas of the coating-receiving surface, depending on the requirements of the coating process. Although the end effector 204 is illustrated with two coating reservoirs 212, the end effector 204 can be configured with more or less than two coating reservoirs 212, depending on the number of coating inlets 108 in the application head 100.

Alternatively, in some examples, the coating application system 200 may include a plurality of applicator heads 100, where each applicator head 100 is coupled to a corresponding coating reservoir 212. That is, each applicator head 100 is fluidically coupled with its own corresponding coating reservoir 212, allowing the coating material 210 to be selectively supplied to the corresponding applicator head 100. That is, the flow of the coating material 210 to each applicator head 100 can be individually controlled, allowing dispensing of coating material based on the specific requirements of the object 202.

Figure 7:
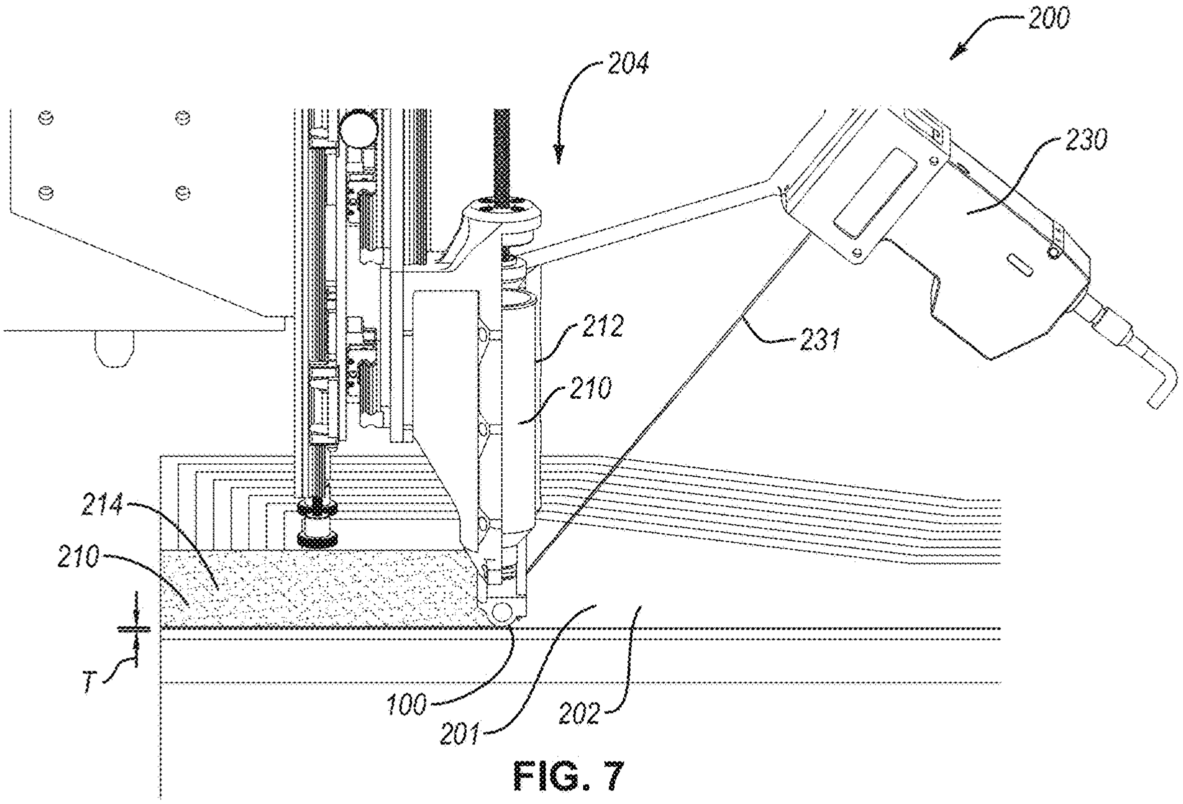
FIG. 7 is a schematic perspective view of a coating application system, applying a coating material onto an object, according to one or more examples of the present disclosure.

In some examples, as shown in FIG. 7, the coating application system 200 includes a laser profilometer 230 configured to measure the coating thickness (T) of the coating 214 as it is applied to the object 202. The laser profilometer 230 is mounted to a forward end of the end effector 204, positioned ahead of the applicator head 100 in the direction of movement of the end effector 204, during the coating application process. The laser profilometer 230 emits a laser path 231 toward the coating-receiving surface 201 of the object 202. The laser path 231 is projected at an angle downward, allowing the laser profilometer 230 to scan the newly applied coating 214 as the applicator head 100 moves along the coating-receiving surface 201. That is, the laser profilometer 230 continuously measures the coating thickness (T) of the coating 214 at a fixed measurement point, relative to the end effector 204 to ensure that it meets the desired coating thickness (T). In some examples, the laser profilometer 230 is part of a feedback system that adjusts the dispensing rate of the coating material 210 in real time to maintain uniformity in the coating thickness (T) of the coating 214.

Figure 10A:
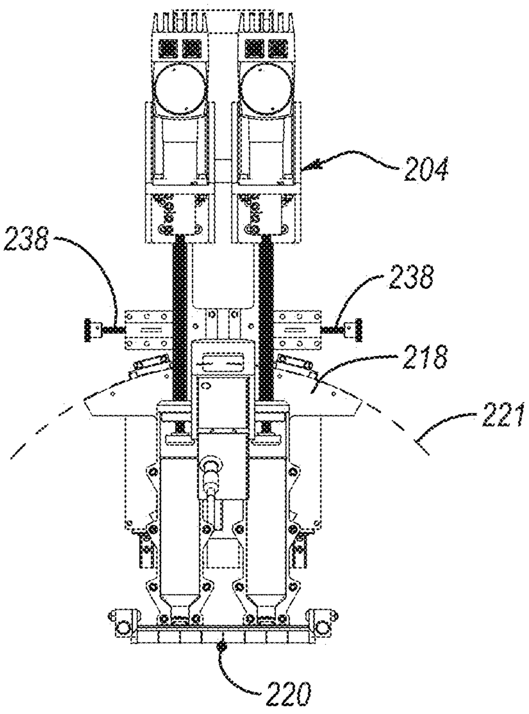
FIG. 10A is a schematic front view of a rotatable assembly of a coating application system, according to one or more examples of the present disclosure.

Referring back to FIG. 5, the end effector 204 includes a rotatable assembly 218 and a base assembly 216. The base assembly 216 is configured to attach to the robotic arm 206 and provide a fixed connection point for the coating application system 200. The rotatable assembly 218 is rotatably coupled to the base assembly 216, such that the rotatable assembly 218 is rotatable relative to the base assembly 216. The applicator head 100 and coating reservoirs 212 are part of the rotatable assembly 218 so they rotate as the rotatable assembly 218 rotates (i.e., co-rotate with the rotatable assembly 218). As shown in FIG. 10A, the rotatable assembly 218 rotates about a pivot axis 220. The pivot axis 220 extends vertically through the bottom center of the applicator head 100, allowing the rotatable assembly 218 to rotate in a rotation path 221 relative to the base assembly 216.

Figure 10B:
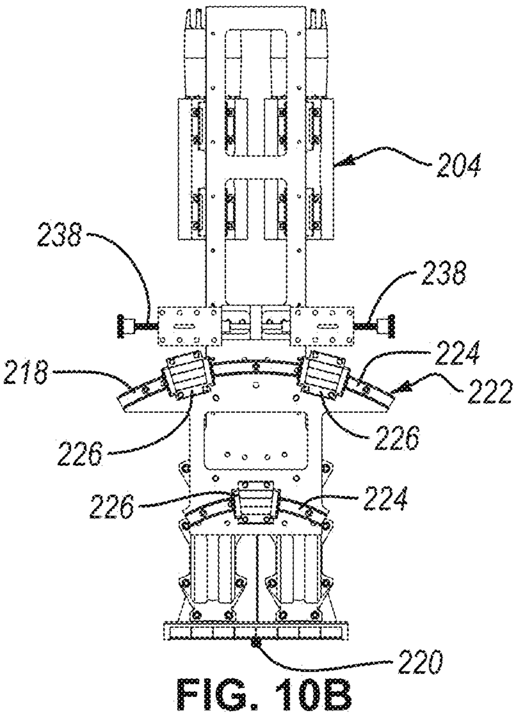
FIG. 10B is a schematic back view of the rotatable assembly of FIG. 10A, according to one or more examples of the present disclosure.

Rotation of the rotatable assembly 218 is guided and controlled by a rotation system 222. Referring to FIG. 10B, the rotation system 222 includes at least one guide rail 224 mounted on the rotatable assembly 218 and at least one rail-coupler 226 mounted to the base assembly. For clarity, the remainder of the base assembly 216 is not shown in FIG. 10B. The rotation system 222 facilitates the connection between the rotatable assembly 218 and the base assembly 216. Specifically, the rail-couplers 226 engage with the guide rail 224. Accordingly, the rotation system 222 enables passive rotation of the rotatable assembly 218, relative to the base assembly 216, as the end effector 204 is moved along the coating-receiving surface 201 of the object 202. The passive rotation allows the applicator head 100 to adjust its orientation based on the contour of the coating-receiving surface 201, which may vary, such as including steps, curves, or other irregular shapes. As the applicator head 100 moves along the coating-receiving surface 201, the rotatable assembly 218 passively rotates to maintain the desired orientation to keep the applicator head 100 perpendicular to the coating-receiving surface 201.

Figure 10C:
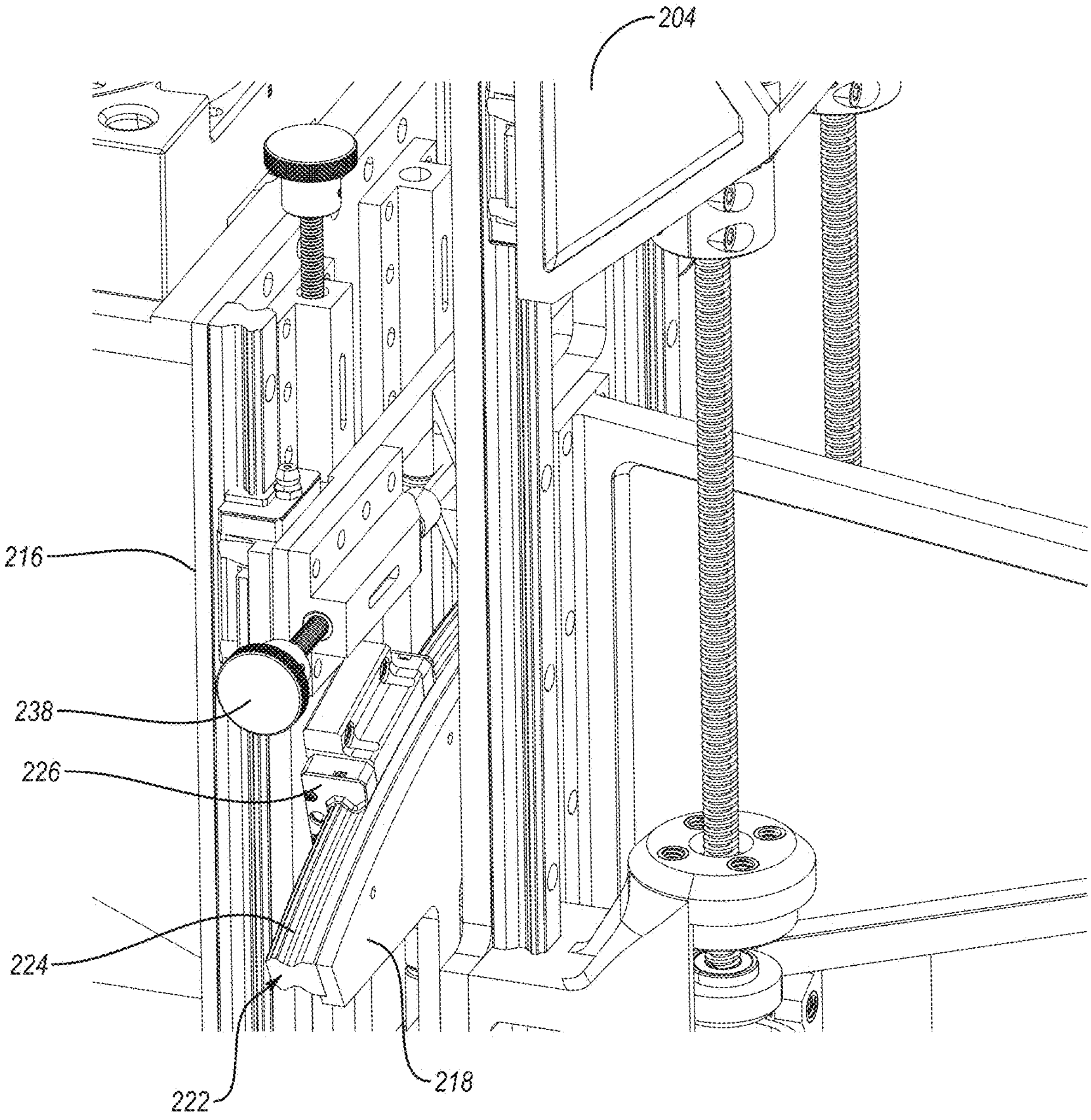
FIG. 10C is a schematic, perspective, partial view of the rotatable assembly of FIG. 10A, rotatably coupled to a base assembly, according to one or more examples of the present disclosure.

Referring to FIG. 10C, the coupling between the guide rail 224 and the rail-coupler 226 is shown. The guide rail 224, which is mounted on the rotatable assembly 218, engages with the rail-couplers 226, which are fixed to the base assembly 216. In other words, the guide rail 224 can slide within the rail-couplers 226, to enable the passive rotation of the rotatable assembly 218 as the end effector 204 moves along the coating-receiving surface 201. The rotation system 222 allows the rotatable assembly 218 to rotate about the pivot axis 220, to facilitate rotational movement in a plane orthogonal to the direction of motion of the end effector 204. That is, the rotatable assembly 218 may pivot from side to side as needed to maintain alignment with the contour of the coating-receiving surface 201.

In some examples, the end effector 204 includes horizontal gas springs 238. The horizontal gas springs 238 are mounted to the end effector 204 to help control the passive rotation of the rotatable assembly 218 about the pivot axis 220. That is, as the rotatable assembly 218 moves in response to the contour of the coating-receiving surface 201, the horizontal gas springs 238 provide a damping effect, which may help with sudden or excessive rotational movement to maintain a consistent alignment of the applicator head 100 relative to the coating-receiving surface 201. The horizontal gas springs 238 can also assist in returning the rotatable assembly 218 to a neutral position from a rotated position. Additionally, the horizontal gas springs 238 can be adjusted to fine-tune the resistance and rotational speed of the rotatable assembly 218.

Figure 8:
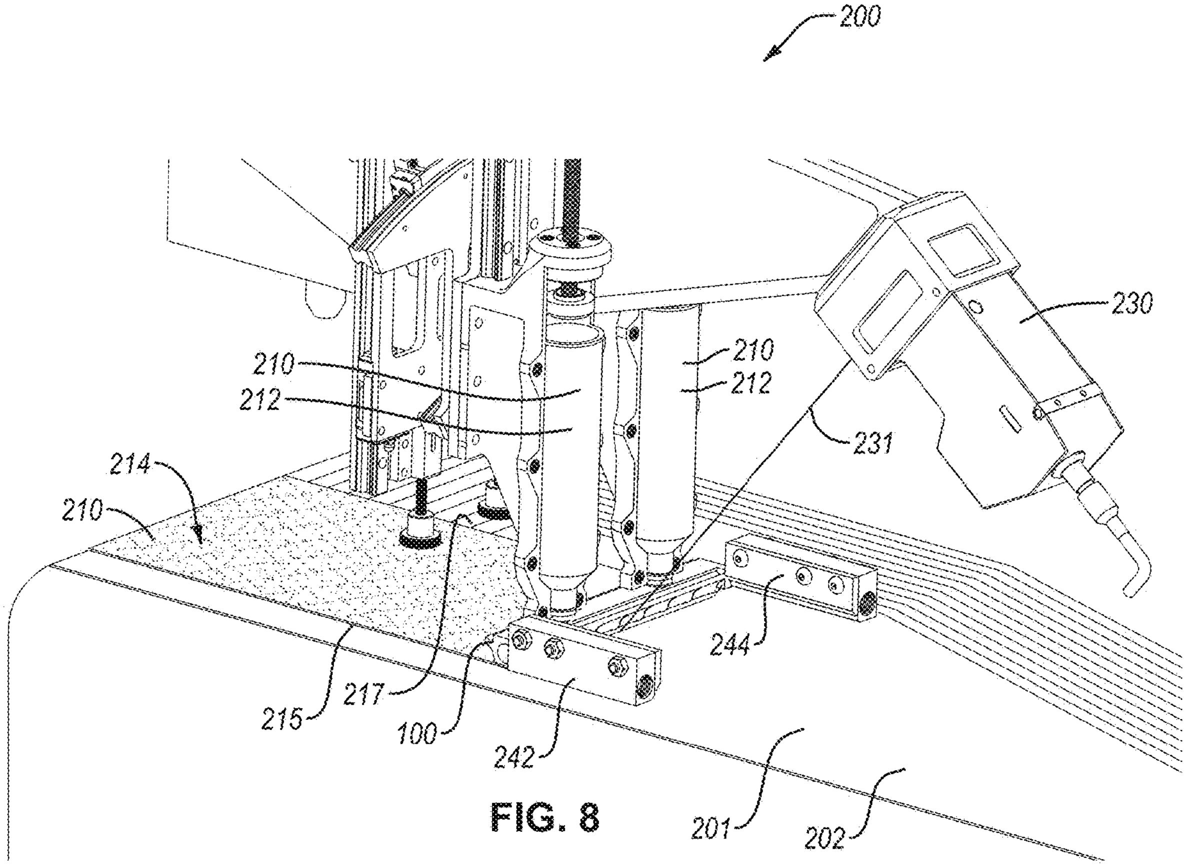
FIG. 8 is a schematic perspective view of a coating application system, having two coating reservoirs, applying a coating material onto an object, according to one or more examples of the present disclosure.
Figure 9:
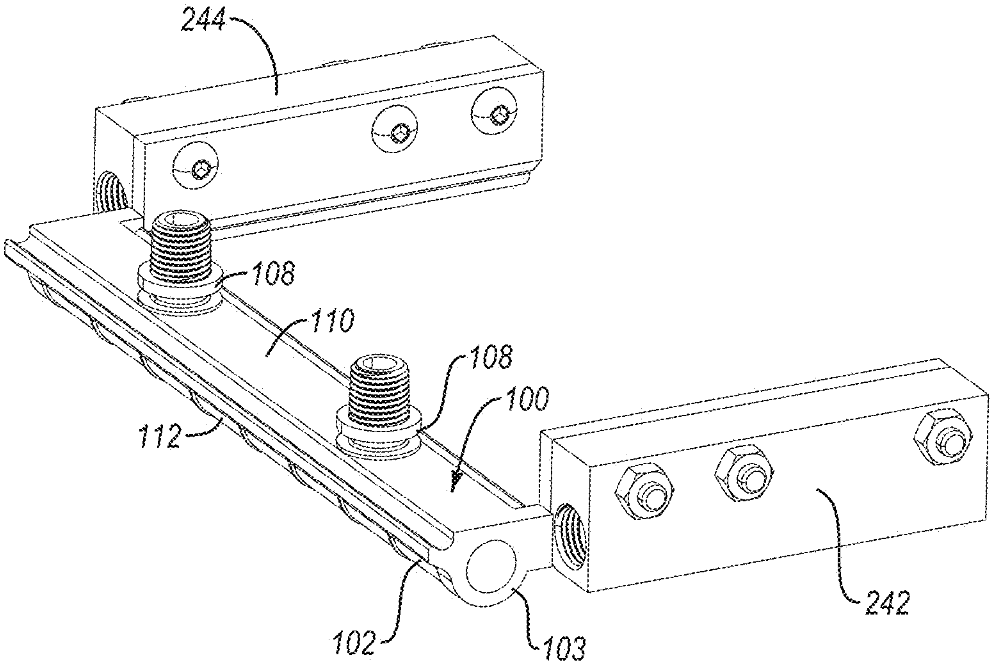
FIG. 9 is a schematic, perspective view of one example of an applicator head, having multiple air knives mounted to the applicator head, according to one or more examples of the present disclosure.

As shown in FIGS. 8 and 9, in some examples, the end effector 204 includes at least one air knife, such as a first air knife 242 and a second air knife 244. At least one air knife is mounted to the applicator head 100 and configured to generate a curtain of air along a corresponding edge of the applicator head 100. The curtain of air helps prevent the coating 214 from spreading beyond a desired boundary or edge on the coating-receiving surface 201. Specifically, the air knife directs airflow to maintain the desired width of the coating 214 by controlling the flow of coating material 210 at the edges. The first air knife 242 is mounted to the applicator head 100 at a first end 103 of the elongated body 102 such that it extends forward of the applicator head 100. The positioning allows the first air knife 242 to generate a curtain of air that directly targets a first edge 215 of the coating 214 as it is applied to the coating-receiving surface 201. Likewise, the second air knife 244 is mounted to the applicator head 100 at the second end 105 of the elongated body 102 such that it extends forward of the applicator head 100. The positioning allows the second air knife 244 to generate a curtain of air that directly targets a second edge 217 of the coating 214, opposite of the first edge 215, as it is applied to the coating-receiving surface 201.

Figure 11A:
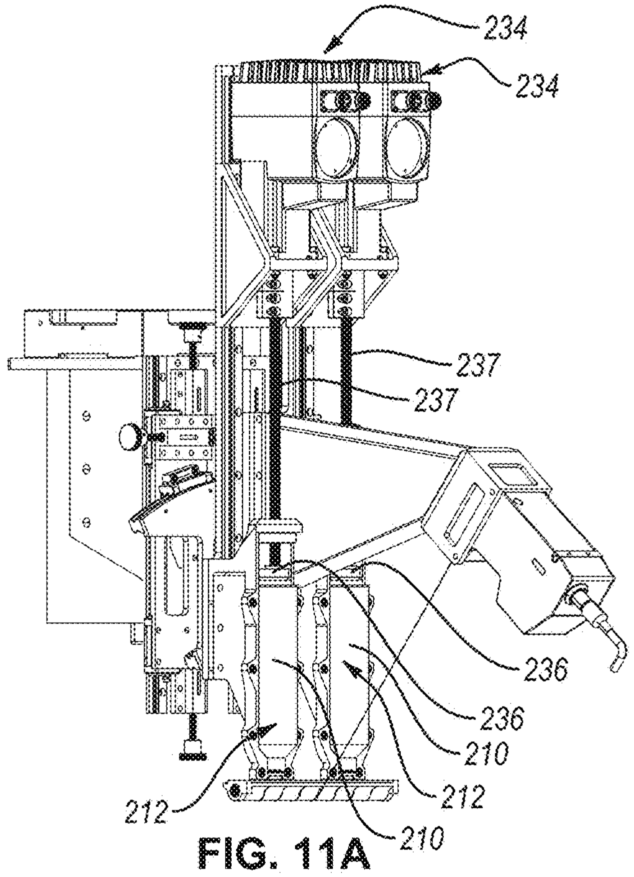
FIG. 11A is a schematic perspective view of a coating application system, having multiple reservoir actuators in a start position, according to one or more examples of the present disclosure.
Figure 11B:
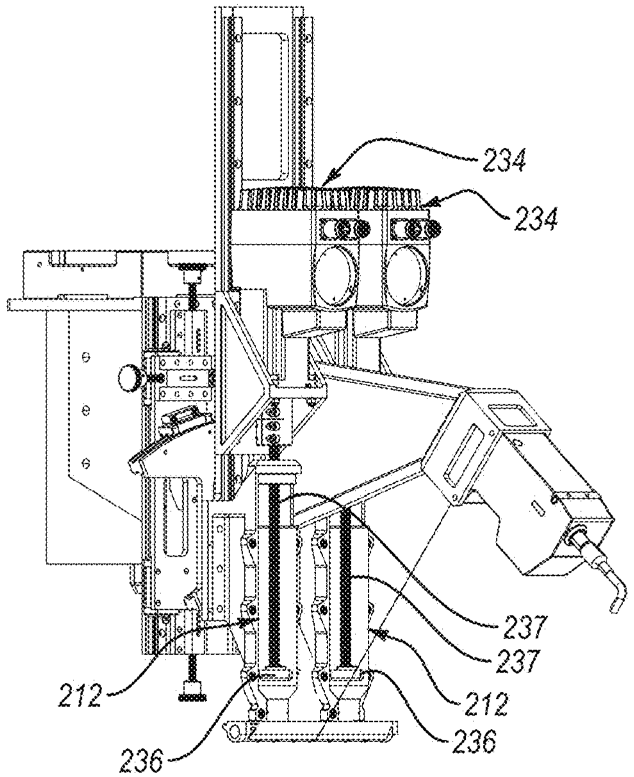
FIG. 11B is a schematic perspective view of the coating application system of FIG. 11, having the multiple reservoir actuators in an end position, according to one or more examples of the present disclosure.

Referring to FIGS. 11A and 11B, a reservoir actuator 234 is operably connected to the coating reservoir 212 and configured to regulate the supply of the coating material 210 from the coating reservoir 212 to the applicator head 100. In some examples, the reservoir actuator 234 is a linear actuator, designed to apply controlled force to a piston 236 within the coating reservoir 212. The linear actuator operates by extending or retracting a rod 237, which moves the piston 236 within the coating reservoir 212. In operation, the reservoir actuator 234 moves the piston 236 within the coating reservoir 212 between and inclusive of a start position, shown in FIG. 11A, and an end position, shown in FIG. 11B. In the start position, the piston 236 is positioned above the coating material 210 and has not yet applied pressure to the coating material 210. Conversely, in the end position, the piston 236 is positioned at the bottom of the coating reservoir 212 and the coating material 210 is fully dispensed from the coating reservoir 212 into the applicator head 100. The movement of the piston 236 between the start position and the end position of the reservoir actuator 234 helps with a consistent and controlled flow of the coating material 210 into the applicator head 100 during the coating application process. In systems with multiple coating reservoirs 212, the end effector 204 may include multiple reservoir actuators 234, with one reservoir actuator coupled to each coating reservoir 212, allowing independent control over the dispensing of coating material 210 from each coating reservoir 212.

Figure 12:
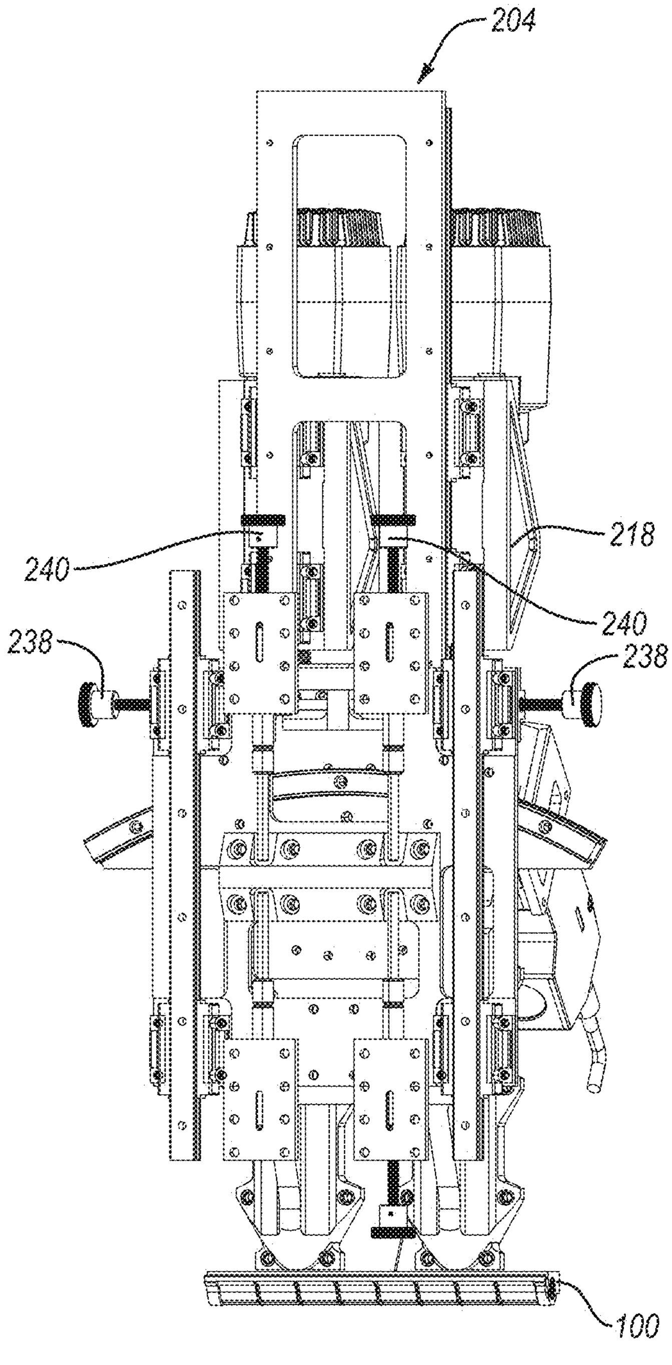
FIG. 12 is a schematic, perspective, partial view of a coating application system, with part of a base assembly removed, according to one or more examples of the present disclosure.

Referring to FIG. 12, in some examples, the end effector 204 includes vertical gas springs 240. The vertical gas springs 240 are located on the base assembly 216 and are configured to apply controlled downward pressure on the end effector 204. The pressure helps ensure that the plurality of external ribs 116 of the applicator head 100 remain in consistent contact with the coating-receiving surface 201 during the coating application process. The vertical gas springs 240 help maintain a uniform application of the coating material 210 by compensating for any surface irregularities on the coating-receiving surface 201. Additionally, the vertical gas springs 240 can be fine-tuned to adjust the amount of downward force, allowing for pressure control based on the requirements of the coating application process. The ability to fine-tune the pressure helps ensure that the coating 214 is applied with the desired thickness and consistency across varying surface contours.

Figure 13:
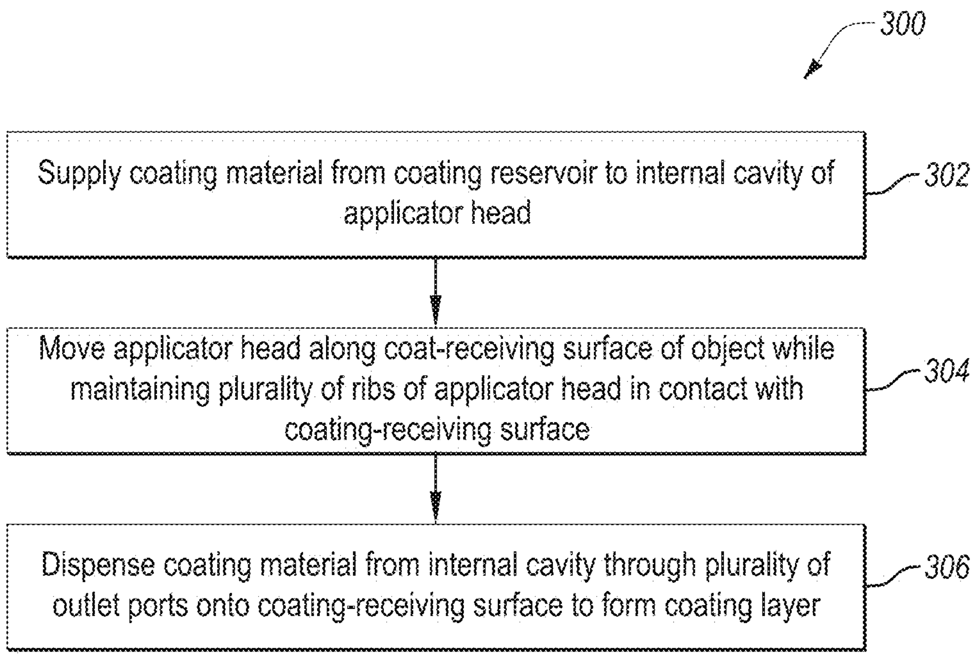
FIG. 13 is a schematic flow chart of applying a coating to an object, according to one or more examples of the present disclosure.

As shown in FIG. 13, a method 300 of applying a coating 214 to an object 202 is disclosed. The method 300 includes (block 302) supplying a coating material 210 from a coating reservoir 212 to an internal cavity 106 of an applicator head 100. The coating reservoir 212 is fluidically coupled with the internal cavity 106 of the applicator head 100. In some examples, the supply of coating material 210 may be regulated by a reservoir actuator 234, which controls the flow of the coating material 210 into the internal cavity 106.

The method 300 also includes (block 304) moving the applicator head 100 along a coating-receiving surface 201 of the object 202 while maintaining a plurality of external ribs 116 of the application head 100 in contact with the coating-receiving surface 201. Downward pressure is applied to the applicator head 100 to keep the plurality of external ribs 116 in consistent contact with the coating-receiving surface 201. This ensures that the applicator head 100 maintains proper alignment with the coating-receiving surface 201, even if the coating-receiving surface 201 has varying contours, such as steps or curves.

The method 300 further includes (block 306) dispensing the coating material 210 from the internal cavity 106 through a plurality of outlet ports 114 of the applicator head 100 onto the coating-receiving surface 201. The coating material 210 forms the coating 214 with a coating thickness (T) defined by a rib height (H) of the plurality of external ribs 116. That is, as the applicator head 100 moves along the coating-receiving surface 201, the plurality of external ribs 116 act as a guide to maintain the coating thickness (T) at the predetermined thickness as the external surface 104 of the applicator head spreads the coating material 210 evenly across the coating-receiving surface 201. In some examples, the applicator head 100 is configured to apply the coating material 210 uniformly across the coating-receiving surface 201 in a single pass of the applicator head 100, reducing the need for multiple coating applications of the coating material.

In some examples, the step of moving the applicator head 100 along the coating-receiving surface 201 is controlled by an end effector 204 attached to a robotic arm 206. Additionally, a laser profilometer 230 may be used to measure the coating thickness (T) of the coating 214 as it is applied, providing real-time feedback.

In other examples, the step of moving the applicator head 100 along the coating-receiving surface 201 is manually controlled by a user. The user may hold the coating reservoir 212, which can serve as a handle, and manually maneuver the applicator head 100 across the coating-receiving surface 201. The plurality of external ribs 116 still provide guidance for maintaining the predetermined thickness, while the manual process allows for more flexibility when coating objects with complex geometries or head-to-reach areas.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

The term "about" or "substantially" in some embodiments, is defined to mean within +/−5% of a given value, however in additional embodiments any disclosure of "about" may be further narrowed and claimed to mean within +/−4% of a given value, within +/−3% of a given value, within +/−2% of a given value, within +/−1% of a given value, or the exact given value. Further, when at least two values of a variable are disclosed, such disclosure is specifically intended to include the range between the two values regardless of whether they are disclosed with respect to separate embodiments or examples, and specifically intended to include the range of at least the smaller of the two values and/or no more than the larger of the two values. Additionally, when at least three values of a variable are disclosed, such disclosure is specifically intended to include the range between any two of the values regardless of whether they are disclosed with respect to separate embodiments or examples, and specifically intended to include the range of at least the A value and/or no more than the B value, where A may be any of the disclosed values other than the largest disclosed value, and B may be any of the disclosed values other than the smallest disclosed value.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. An applicator head for applying a coating to an object, the applicator head comprising:
 - an elongated body comprising an external surface and an internal cavity extending along a body length of the elongated body;
 - a coating inlet formed in an upper portion of the elongated body, and fluidically coupled with the internal cavity to enable a coating material to flow into the internal cavity from the coating inlet;
 - a plurality of outlet ports positioned along a lower portion of the elongated body so that each one of the plurality of outlet ports is fluidically coupled with the internal cavity to enable the coating material to be dispensed from the internal cavity; and
 - a plurality of external ribs disposed along the external surface of the elongated body, wherein each one of the plurality of external ribs extends at a rib height from the external surface of the elongated body, and wherein at least one outlet port of the plurality of outlet ports is positioned between adjacent ones of the plurality of external ribs.

2. The applicator head of claim 1, wherein each one of the plurality of external ribs:
 - is oriented perpendicular to a longitudinal axis extending through a center of the elongated body along the body length; and
 - only partially surrounds the external surface of the elongated body.

3. The applicator head of claim 1, wherein each one of the plurality of external ribs is evenly spaced along the body length of the elongated body so that a rib distance between adjacent ones of the plurality of external ribs is the same.

4. The applicator head of claim 1, wherein a size of the plurality of outlet ports is the same.

5. The applicator head of claim 1, wherein a size of at least one of the plurality of outlet ports is different than a size of at least another of the plurality of outlet ports.

6. The applicator head of claim 1, wherein:
 - each one of the plurality of outlet ports is aligned along a port axis; and
 - the port axis is parallel to and offset from a longitudinal axis extending through a center of the elongated body along the body length.

7. The applicator head of claim 1, further comprising a bead notch in the lower portion of the elongated body, wherein the bead notch:
 - is oriented parallel to the plurality of external ribs; and
 - is fluidically coupled with the internal cavity.

8. The applicator head of claim 1, further comprising:
 - a plurality of internal cavities extending along the body length of the elongated body, the internal cavity being one of the plurality of internal cavities;
 - a plurality of coating inlets formed in the upper portion of the elongated body, the coating inlet being one of the plurality of coating inlets;

wherein:
 - the plurality of internal cavities are laterally aligned along the elongated body so that each internal cavity is positioned adjacent to others of the plurality of internal cavities along the body length of the elongated body;
 - each one of the plurality of coating inlets is fluidically coupled with a corresponding one of the plurality of internal cavities to enable the coating material to flow into the plurality of internal cavities from the corresponding coating inlet; and
 - each one of the plurality of internal cavities corresponds to selected ones of the plurality of outlet ports.

9. A coating application system for applying a coating to an object, the coating application system comprising:
 - an end effector removably attached to a robotic arm;
 - an applicator head attached to a lower end of the end effector, the applicator head comprising:
   - an elongated body comprising an external surface and an internal cavity extending along a body length of the elongated body;
   - a coating inlet formed in an upper portion of the elongated body, and fluidically coupled with the internal cavity to enable a coating material to flow into the internal cavity from the coating inlet;
   - a plurality of outlet ports positioned along a lower portion of the elongated body so that each one of the plurality of outlet ports is fluidically coupled with the internal cavity to enable the coating material to be dispensed from the internal cavity; and
   - a plurality of external ribs disposed along the external surface of the elongated body, wherein each one of the plurality of external ribs extends at a rib height from the external surface of the elongated body, and wherein at least one outlet port of the plurality of outlet ports is positioned between adjacent ones of the plurality of external ribs;
 - a coating reservoir removably attached to the end effector and fluidically coupled with the coating inlet of the applicator head, the coating reservoir configured to selectively supply the coating material to the applicator head;

wherein:
 - the end effector is configured to control movement of the applicator head relative to a coating-receiving surface of the object, such that the applicator head is movable along the coating-receiving surface;
 - when the applicator head is moved along the coating-receiving surface, each one of the plurality of external ribs is in contact with the coating-receiving surface; and
 - when the coating reservoir is supplying the coating material to the applicator head and the applicator head is moved along the coating-receiving surface, the coating material is dispensed from the plurality of outlet ports onto the coating-receiving surface to form the coating of the coating material having a coating thickness defined by the rib height of the plurality of external ribs.

10. The coating application system of claim 9, wherein the end effector comprises:
 - a base assembly configured to attach to the robotic arm;
 - a rotatable assembly rotatably coupled to the base assembly, wherein the rotatable assembly rotates about a pivot axis, and wherein the applicator head and the coating reservoir are attached to the rotatable assembly of the end effector; and a rotation system comprising:

at least one guide rail mounted on the rotatable assembly; and at least one rail-coupler mounted to the base assembly and coupled to at least one guide rail to rotatably couple the rotatable assembly to the base assembly;

wherein the rotation system enables passive rotation of the rotatable assembly relative to the base assembly as the end effector is moved along the coating-receiving surface of the object.

11. The coating application system of claim 9, further comprising a laser profilometer mounted to the end effector and configured to continuously measure the coating thickness of the coating at a fixed measurement point, relative to the end effector.

12. The coating application system of claim 9, further comprising a reservoir actuator operably connected to the coating reservoir and configured to regulate the supply of the coating material from the coating reservoir to the applicator head.

13. The coating application system of claim 9, wherein the end effector is configured to apply the coating material uniformly across the coating-receiving surface in a single pass of the applicator head.

14. The coating application system of claim 9, further comprising:

a plurality of coating reservoirs removably attached to the end effector, the coating reservoir being one of the plurality of coating reservoirs; and the applicator head further comprises:

a plurality of internal cavities extending along the body length of the elongated body, the internal cavity being one of the plurality of internal cavities;

a plurality of coating inlets formed in the upper portion of the elongated body, the coating inlet being one of the plurality of coating inlets;

wherein:

the plurality of internal cavities are laterally aligned along the elongated body so that each internal cavity is positioned adjacent to others of the plurality of internal cavities along the body length of the elongated body;

each one of the plurality of coating reservoirs is fluidically coupled with a corresponding one of the plurality of coating inlets of the applicator head;

each one of the plurality of coating inlets is fluidically coupled with a corresponding one of the plurality of internal cavities to enable the coating material to flow into the plurality of internal cavities from the corresponding coating inlet; and each one of the plurality of internal cavities corresponds to selected ones of the plurality of outlet ports.

15. The coating application system of claim 14, wherein each one of the plurality of coating reservoirs is individually operable to enable the coating material to flow into a corresponding one of the plurality of internal cavities and dispense the coating material from the selected ones of the plurality of outlet ports.

16. The coating application system of claim 9, further comprising:

a plurality of coating reservoirs removably attached to the end effector, the coating reservoir being one of the plurality of coating reservoirs; and a plurality of applicator heads attached to the lower end of the end effector, the applicator head being one of the plurality of applicator heads;

wherein each one of the plurality of coating reservoirs is fluidically coupled with the coating inlet of a corresponding one of the plurality of applicator heads and configured to selectively supply the coating material to the corresponding one of the plurality of applicator heads.

17. The coating application system of claim 9, further comprises:

a first air knife mounted to the applicator head at a first end of the elongated body, the first air knife extending forward of the applicator head and directed toward the coating-receiving surface and configured to generate a curtain of air along a first edge of the coating; and a second air knife mounted to the applicator head at a second end of the elongated body, the second air knife extending forward of the applicator head and directed toward the coating-receiving surface and configured to generate a curtain of air along a second edge of the coating;

wherein when the coating material is dispensed from the plurality of outlet ports onto the coating-receiving surface to form the coating, the curtain of air from the first air knife is directed at the first edge of the coating and the curtain of air from the second air knife is directed at the second edge of the coating to prevent the coating material from extending beyond the first edge and the second edge.

18. A method of applying a coating to an object, the method comprising:

supplying a coating material from a coating reservoir to an internal cavity of an applicator head, the coating reservoir fluidically coupled with the internal cavity of the applicator head;

moving the applicator head along a coating-receiving surface of the object while maintaining a plurality of external ribs of the applicator head in contact with the coating-receiving surface; and dispensing the coating material from the internal cavity through a plurality of outlet ports of the applicator head onto the coating-receiving surface to form a coating of the coating material having a coating thickness defined by a rib height of the plurality of external ribs, wherein at least one outlet port of the plurality of outlet ports is positioned between adjacent ones of the plurality of external ribs.

19. The method of claim 18, wherein:

the step of moving the applicator head along the coating-receiving surface of the object is controlled by an end effector attached to a robotic arm;

the applicator head is attached to a lower end of the end effector;

the step of dispensing the coating material from the internal cavity through the plurality of outlet ports of the applicator head is facilitated by the end effector; and the method further comprises regulating flow of the coating material via the end effector.

20. The method of claim 18, wherein the step of moving the applicator head along the coating-receiving surface of the object is manually controlled by a user.

* * * * *